United States Patent
Wu et al.

(10) Patent No.: US 11,084,262 B2
(45) Date of Patent: Aug. 10, 2021

(54) POLYAMIDE COMPOSITION AND FILM AND METHOD FOR MANUFACTURING THE SAME

(71) Applicant: INDUSTRIAL TECHNOLOGY RESEARCH INSTITUTE, Hsinchu (TW)

(72) Inventors: Jyh-Horng Wu, Kaohsiung (TW); Ming-Tsong Leu, Tainan (TW); Sheng-Lung Chang, Taoyuan (TW); Hung-Jen Liu, Hsinchu (TW); Po-Ling Shiao, Hsinchu (TW); Yen-Cheng Li, Hsinchu (TW); Yih-Her Chang, Baoshan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 233 days.

(21) Appl. No.: 16/231,695

(22) Filed: Dec. 24, 2018

(65) Prior Publication Data
US 2019/0322866 A1    Oct. 24, 2019

(30) Foreign Application Priority Data
Apr. 18, 2018 (TW) .................... 107113189

(51) Int. Cl.
| B32B 27/34 | (2006.01) |
| B32B 27/02 | (2006.01) |
| B32B 27/08 | (2006.01) |

(52) U.S. Cl.
CPC .............. B32B 27/34 (2013.01); B32B 27/08 (2013.01); C08L 77/02 (2013.01); *B32B 2307/518* (2013.01); *C08L 2205/02* (2013.01)

(58) Field of Classification Search
CPC ... B32B 27/08; B32B 27/34; B32B 2307/518; B32B 15/20; B32B 3/02; B32B 27/302;
(Continued)

(56) References Cited

U.S. PATENT DOCUMENTS

| 2007/0202337 A1 | 8/2007 | Lischefski et al. |
| 2012/0053293 A1 | 3/2012 | Mathew |
| 2017/0009384 A1 | 1/2017 | Bhargava |

FOREIGN PATENT DOCUMENTS

| CN | 1891756 A | 1/2007 |
| CN | 101878271 A | 11/2010 |

(Continued)

OTHER PUBLICATIONS

Machine translation of JP 53-006355 (Year: 1978).*
(Continued)

*Primary Examiner* — John D Freeman
(74) *Attorney, Agent, or Firm* — Birch, Stewart, Kolasch & Birch, LLP

(57) ABSTRACT

A method of forming a film is provided, which includes providing a sheet from a polyamide composition; and biaxial stretching of the sheet to form a film, wherein the polyamide composition includes a blend of a first polyamide and a second polyamide. The first polyamide has a repeating unit of (a)

(Continued)

and the second polyamide has repeating units of

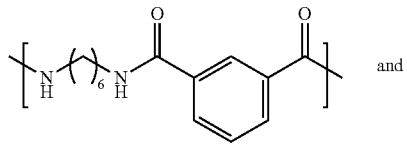 and

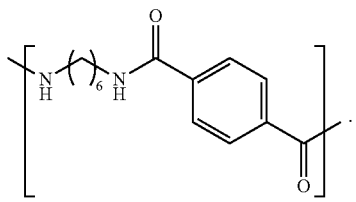

The second polyamide is a crystalline random copolymer. The sheet of the polyamide composition is biaxially stretched at a rate of 20 mm/sec to 100 mm/sec.

8 Claims, 1 Drawing Sheet

(58) Field of Classification Search
CPC .......... B32B 2307/306; B32B 2439/70; B32B 2307/7244; B32B 2270/00; B32B 2307/516; B32B 2307/554; B32B 2307/704; B32B 2307/732; B32B 2250/242; B32B 27/306; B32B 27/304; B32B 27/32; B32B 15/088; B32B 27/36; B32B 27/06; C08L 77/02; C08L 2205/02; C08L 2203/16; C09D 177/02; C08G 69/28; C08G 69/265; B29C 55/12; C08J 2377/00; C08J 2477/06; C08J 2377/02; C08J 5/18

See application file for complete search history.

(56) References Cited

FOREIGN PATENT DOCUMENTS

| | | |
|---|---|---|
| CN | 105778488 A | 7/2016 |
| EP | 0 609 792 A1 | 8/1994 |
| JP | 53006355 A * | 1/1978 |
| JP | 7-33982 A | 2/1995 |
| JP | 11-181278 A | 7/1999 |
| JP | 2010-174158 A | 8/2010 |
| JP | 2012-122066 A | 6/2012 |
| JP | 2013-136220 A | 7/2013 |
| TW | 208684 B | 7/1993 |

OTHER PUBLICATIONS

Machine translation of JP 2010-174158 (Year: 2010).*
Taiwanese Office Action and Search Report, dated Mar. 20, 2019, for Taiwanese Application No. 107113189.
Japanese Office Action dated Feb. 25, 2020 for Application No. 2019-071793, along with an English translation.
Takashige et al., "Easy tear film of biaxially oriented PA 6/MXD 6 blend by double bubble tubular film process", International polymer processing XIX, 2004, pp. 147-154.
Takashige et al., "Easy tear multilayer film of biaxially oriented PA6/MXD6 by double bubble tubular film process", International polymer processing XX, 2005, pp. 100-104.
Chinese Office Action for Application No. 201910067454.3, dated May 19, 2021.

* cited by examiner

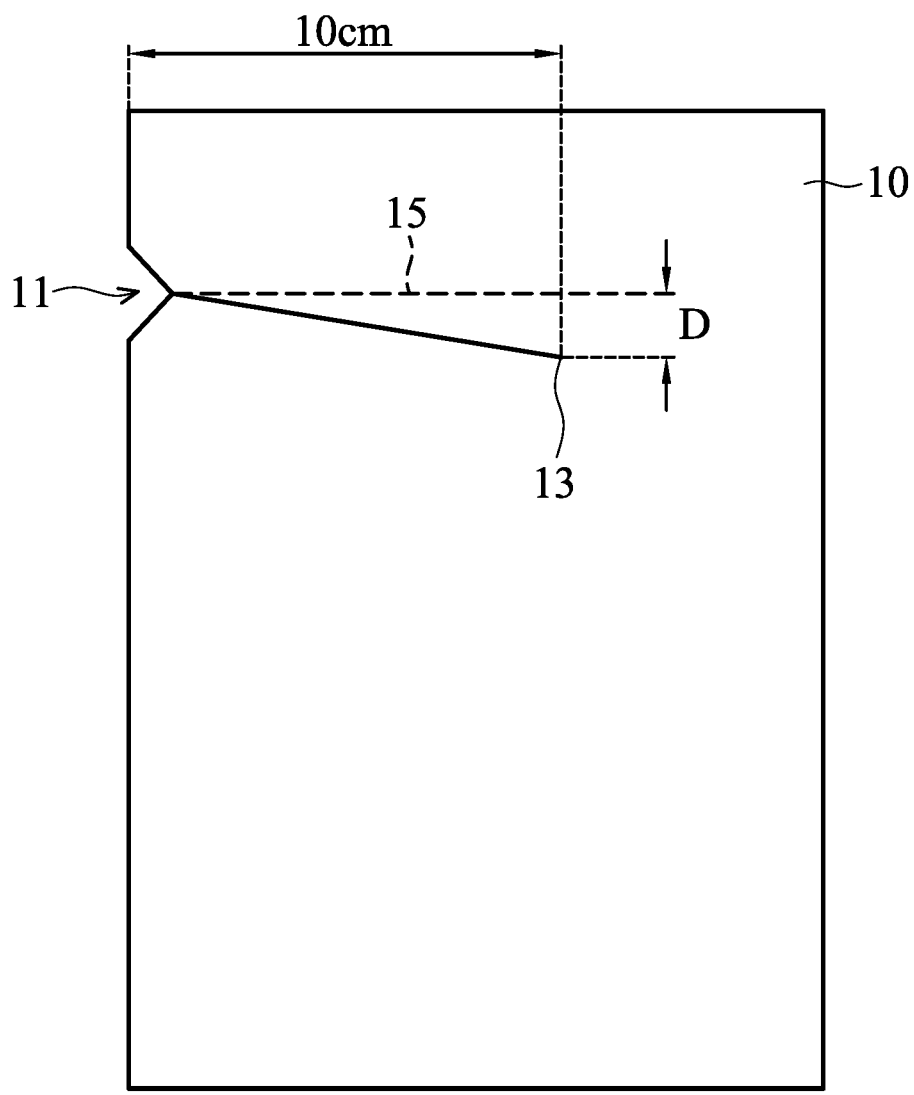

POLYAMIDE COMPOSITION AND FILM AND METHOD FOR MANUFACTURING THE SAME

CROSS REFERENCE TO RELATED APPLICATIONS

The present application is based on, and claims priority from, Taiwan Application Serial Number 107113189, filed on Apr. 18, 2018, the disclosure of which is hereby incorporated by reference herein in its entirety.

TECHNICAL FIELD

The technical field relates to a blend of polyamides.

BACKGROUND

The demand for polyamide film has grown in a number fields and industries, such as food, electronics, and medical industries. This growing demand can be attributed to the excellent properties of polyamide films (e.g. anti-punching properties, abrasion resistance, wide application temperature range, thermal resistance under vacuum, non-toxicity, no plasticizer release, high gas barrier rate, and the like). In recent years, the percentage of the global population representing senior citizens (generally, aged 65 and over) has rapidly increased. To enable elderly and disabled people to live comfortable lives and to enjoy a social life akin to that of young, healthy people, polyamide films with easy-tear properties for use in polyamide laminate packaging material (a concept in the packaging field known as "accessibility") has started to attract attention. Easy-tear polyamide film is critical to the development of the global soft-plastic packaging market. Easy-tear polyamide laminate packaging material can be utilized for packaging food such as sauce sachets, seasoning packages, edible oil packages, food packages, congee packages, breast milk bags, beverage bags, and so on.

Accordingly, a novel polyamide composition to be used in easy-tear films is called for.

SUMMARY

One embodiment of the disclosure provides a polyamide composition, including: a blend of a first polyamide and a second polyamide, wherein the first polyamide has a repeating unit of

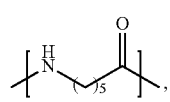
(a)

and the second polyamide has repeating units of

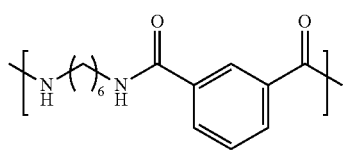
and

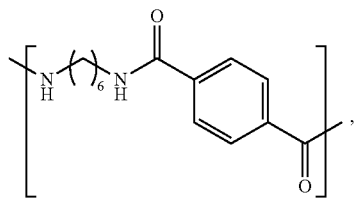
(b2)

and the second polyamide is a crystalline random copolymer.

One embodiment of the disclosure provides a film, including a polyamide composition including a blend of a first polyamide and a second polyamide, wherein the first polyamide has a repeating unit of

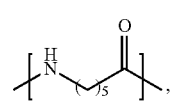
(a)

and the second polyamide has repeating units of

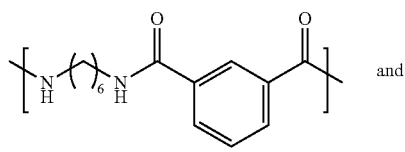
and
(b1)

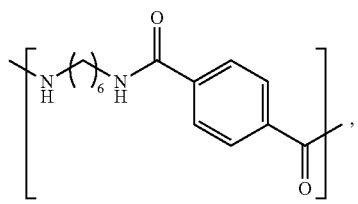
(b2)

and the second polyamide is a crystalline random copolymer.

One embodiment of the disclosure provides a method of forming a film, including: providing a sheet of a polyamide composition; and biaxial stretching of the sheet of the polyamide composition to form a film, wherein the polyamide includes a blend of a first polyamide and a second polyamide; wherein the first polyamide has a repeating unit of

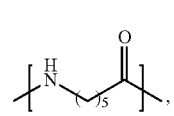
(a)

the second polyamide has repeating units of

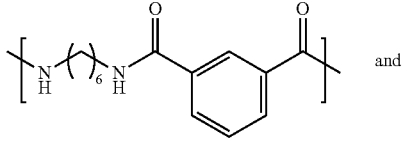
(b1)

and

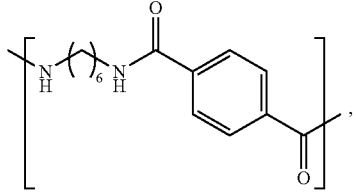
(b2)

and the second polyamide is a crystalline random copolymer, wherein the sheet of the polyamide composition is biaxially stretched at a rate of 20 mm/sec to 100 mm/sec.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows an easy-tear test of films in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a polyamide composition, including: a blend of a first polyamide and a second polyamide, wherein the first polyamide has a repeating unit of

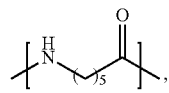
(a)

and the second polyamide has repeating units of

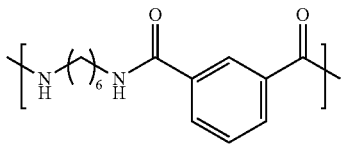
(b1)

and

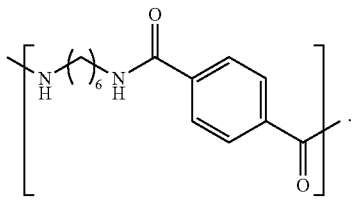
(b2)

The second polyamide is a crystalline random copolymer. In one embodiment, the first polyamide and the second polyamide have a weight ratio of 90:10 to 70:30. Alternatively, the first polyamide and the second polyamide have a weight ratio of 85:15 to 75:25. The second polyamide with a weight content that is too high may increase the cost and the process difficulty of the polyamide composition. The second polyamide with a weight content that is too low is hard to form a film with easy-tear properties.

In one embodiment, the repeating units

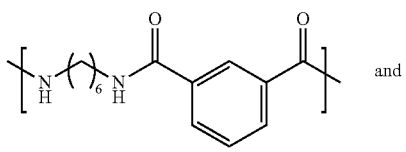
(b1)

and

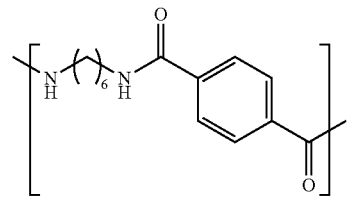
(b2)

of the second polyamide have a molar ratio of 65:35 to 55:45. If the mole fraction of repeating unit

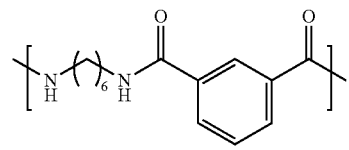
(b1)

in the second polyamide is too high, the polyamide will be an amorphous polymer. As such, a film manufactured from a polyamide composition containing the amorphous polymer still lacks easy-tear properties. If the mole fraction of repeating unit

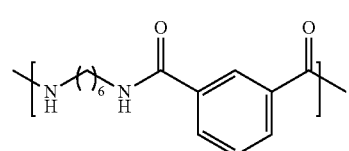
(b1)

in the second polyamide is too low, the second polyamide will have a melting point that is too high to be blended with the first polyamide and processed to manufacture a film.

In one embodiment, the first polyamide has a relative viscosity of 2.5 to 4.0 at 25° C., and the second polyamide has a relative viscosity of 1.01 to 2.5. The first polyamide and the second polyamide having a relative viscosity that is too high or too low are not suitable for the subsequent processing for manufacturing a film. In one embodiment, the first polyamide and the second amide have a relative viscosity difference of 0 to 2. A relative viscosity difference that is too great is not beneficial to blend the first polyamide and the second polyamide and the subsequent processing for manufacturing a film.

In one embodiment, the second polyamide has a melting point (Tm) of 220° C. to 260° C., a temperature of cooling crystallization (Tcc) of 170° C. to 215° C., and a glass transition temperature (Tg) of 120° C. to 130° C. A second polyamide having a melting point that is too high or too low will be difficult to process with the first polyamide, because the difference between the melting points of the first polyamide and the second polyamide is too great. In one embodiment, the polyamide composition has a melting point of 195° C. to 225° C. and a crystallinity of 20% to 30%.

One embodiment of the disclosure provides a film, including a polyamide composition including a blend of a first polyamide and a second polyamide, wherein the first polyamide has a repeating unit of

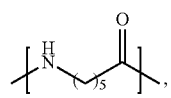

(a)

and the second polyamide has repeating units of

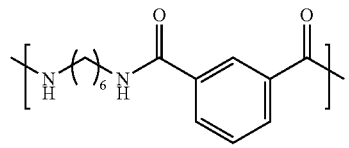

and (b1)

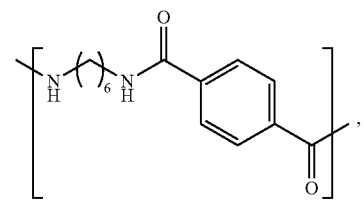

(b2)

and the second polyamide is a crystalline random copolymer. In one embodiment, the film thickness satisfies the product standard, such as 15 micrometers to 25 micrometers. Alternatively, the film thickness can be increased or decreased to satisfy product requirements. In one embodiment, the film can be laminated to other film substrate, and the film substrate can be made of a polymer such as polyethylene terephthalate (PET), ethylene vinyl acetate (EVA), high density polyethylene (HDPE), polypropylene (PP), polyvinyl chloride (PVC), polyvinylidene chloride (PVDC), polyvinyl alcohol (PVA), polystyrene (PS), low density polyethylene (LDPE), linear low density polyethylene (LLDPE), saponified ethylene vinyl acetate (EVOH), polymethyl methacrylate (PMMA), ionic exchange polymer, or a mixture thereof. The film substrate can be used directly or subjected to further stretching, either single-axial or biaxial. In addition, a metal foil such as aluminum foil can be used to form the laminated film. Furthermore, a combination film of the polymer film and the metal foil can also be used. The lamination method can be extrusion lamination, hot-melting lamination, dry lamination, or wet lamination. In one embodiment, the laminated film thickness satisfies the general product standard, such as 50 micrometers to 120 micrometers. Alternatively, the thickness of each layer in the laminated film can be increased or decreased to satisfy product requirements.

One embodiment of the disclosure provides a method of forming a film, including: providing a sheet from a polyamide composition; and biaxial stretching of the sheet to form a film, wherein the polyamide composition includes a blend of a first polyamide and a second polyamide; wherein the first polyamide has a repeating unit of

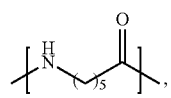

(a)

the second polyamide has repeating units of

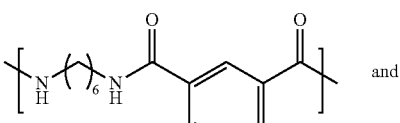 and (b1)

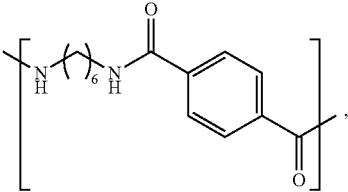

(b2)

and the second polyamide is a crystalline random copolymer. The film can be formed by the following method. For example, the m-phthalic acid, p-phthalic acid, and 1,6-diaminohexane of an appropriate molar ratio are mixed and heated to 200° C. under nitrogen to be condensation polymerized for about 3 hours. Afterward, polymerization catalyst such as tributyl tin or the other suitable catalyst of a catalyst amount is added to the condensation polymerization, and then heated to about 280° C. under vacuum to be further polymerized, thereby obtaining a random copolymer (e.g. the second polyamide). Subsequently, the first polyamide and the second polyamide are put into a film extruder under nitrogen, melting blended, and then extruded from a T-die to form a flat sheet-shaped film. In one embodiment, the melting blend is performed at a temperature of 220° C. to 260° C., which is determined by the melting points of the polyamide and the second polyamide. The difference between the melting point of the second polyamide and that of the first polyamide should be less than 50° C. for smoothly implementing the melting blend. The sheet-shaped film is then attached to a cooling roller, and then wound by a drawing roller to form a sheet. In one embodiment, the cooling roller temperature is 20° C. to 45° C. A cooling roller with temperature setting that is too high easily sticks the sheet-shaped film thereon. A cooling roller with temperature setting that is too low may overly shrink the sheet-shaped film to cause issues such as warpage. The sheet is then pre-heated by a biaxial stretcher (such as KARO IV), and then simultaneously biaxially stretched along a machine direction (MD) and a transverse direction (TD) at a stretching rate of 20 mm/second to 100 mm/second, in which both the stretching ratios of MD and TD are 2.5 times to 3.5 times (e.g. 3.0 times), and the sheet is pre-heated to a temperature of 180° C. to 200° C. (e.g. 190° C.). A sheet pre-heated to a temperature that is too high easily forms holes during the stretching of the sheet. A sheet pre-heated to a temperature that is too low easily forms a broken film during stretching. In one embodiment, the biaxial stretching rate is 20 mm/seconds to 40 mm/second. A biaxial stretching rate that is too high may affect the easy-tear properties of the film. A biaxial stretching rate that is too low may increase the period of the manufacture. In some embodiments, a film formed using a high stretching rate does not have the easy-tear properties, but a film formed using the low stretching rate has easy-tear properties. It should be noted that if the second polyamide is amorphous, the film will not have easy-tear properties, no matter whether the stretching rate is low or high. A biaxial stretching ratio that is too high cannot form the film well. A biaxial stretching ratio that is too low results in poor easy-tear properties. The stretched film is then put into a heat treatment oven for heat setting the film. In one embodiment, the heat treatment is performed at a temperature of 200° C. to 220° C., such as 210° C. A heat treatment temperature that is too high cannot form the film well. A heat treatment temperature that is too low may lower the size stability of the film.

The film formed by the above process has not only easy-tear properties, but also anti-punching properties, abrasion resistance, wide application temperature range, thermal resistance under vacuum, non-toxicity, no plasticizer release, high gas barrier rate, and the like, making the film suitable for packaging food.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Test of Easy-Tear Properties

As shown in FIG. 1, an opening was introduced to a film 10, and the film was then torn from the opening 11. A vertical distance D between a tear location 13 (laterally spaced 10 cm from the opening 11) and an ideal tear line 15 (laterally extended from the opening 11 and vertical to an edge of the film 10) was measured. When the vertical distance D between the ideal tear line 15 and the tear location 13 was equal to or less than 5 mm, the film was considered as being easy-tear. The above test can be referred to as the linear cut test in International Polymer Processing XIX (2004 vol. 2, p. 147).

Preparation Example 1

332 g of m-phthalic acid (2 mole), 332 g of p-phthalic acid (2 mole), and 464 g of 1,6-diaminohexane (4 mole) were mixed and heated to 200° C. under nitrogen to be condensation polymerized for about 3 hours. The water from the condensation polymerization was removed by Dean-Stark apparatus. Afterward, 0.33 g of tributyl tin (300 ppm) serving as polymerization catalyst was added to the condensation polymerization, and then heated to about 280° C. under vacuum (200 torr/30 minutes→500 torr/30 minutes→back to 760 torr after the polymerization) to be further polymerized, thereby obtaining a random copolymer. The repeating units

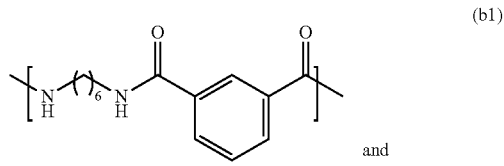

(b1)

and

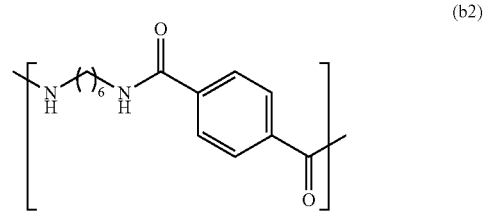

(b2)

of the random copolymer had a molar ratio of 5:5. The random copolymer had a relative viscosity of 1.17. The relative viscosity was measured by the following steps: phenol and tetrachloroethane (v/v=6/4) served as solvent, and a sample (e.g. the random copolymer) was dissolved in the solvent to prepare a sample solution with a concentration of 0.3 g/dL. A period of the sample solution flowing through an Oswald viscometer at 25° C. was measured as t. A period of the solvent of phenol and tetrachloroethane (v/v=6/4) flowing through the Oswald viscometer at 25° C. was measured as t0. The ratio of t to t0 (t/t0) was the relative viscosity of the sample. As analyzed by differential scanning calorimetry (DSC), the random copolymer had Tg of 124° C., Tcc of 175° C., and Tm of 270° C.

Preparation Example 2

399 g of m-phthalic acid (2.4 mole), 265 g of p-phthalic acid (1.6 mole), and 464 g of 1,6-diaminohexane (4 mole) were mixed and heated to 200° C. under nitrogen to be condensation polymerized for about 3 hours. The water from the condensation polymerization was removed by Dean-Stark apparatus. Afterward, 0.33 g of tributyl tin (300 ppm) serving as polymerization catalyst was added to the condensation polymerization, and then heated to about 280° C. under vacuum (200 torr/30 minutes→500 torr/30 minutes→back to 760 torr after the polymerization) to be further polymerized, thereby obtaining a random copolymer. The repeating units

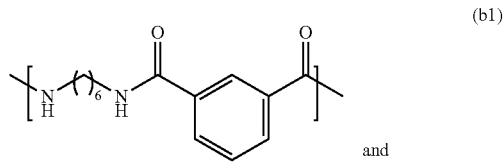

(b1)

and

-continued

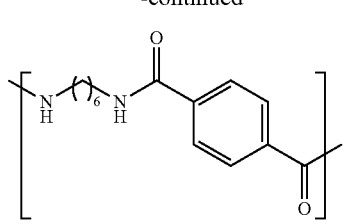

of the random copolymer had a molar ratio of 6:4. The random copolymer had a relative viscosity of 1.27. As analyzed by DSC, the random copolymer had Tg of 126° C., Tcc of 207° C., and Tm of 245° C.

Preparation Example 3

466 g of m-phthalic acid (2.8 mole), 198 g of p-phthalic acid (1.2 mole), and 464 g of 1,6-diaminohexane (4 mole) were mixed and heated to 200° C. under nitrogen to be condensation polymerized for about 3 hours. The water from the condensation polymerization was removed by Dean-Stark apparatus. Afterward, 0.33 g of tributyl tin (300 ppm) serving as polymerization catalyst was added to the condensation polymerization, and then heated to about 280° C. under vacuum (200 torr/30 minutes→500 torr/30 minutes→back to 760 torr after the polymerization) to be further polymerized, thereby obtaining a random copolymer. The repeating units

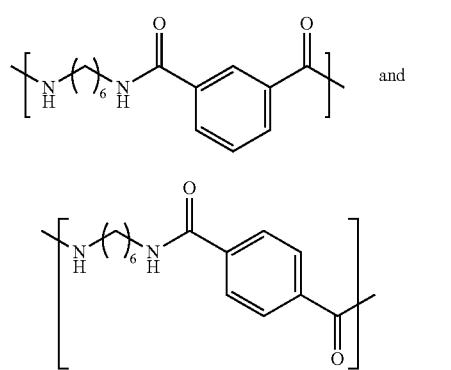

of the random copolymer had a molar ratio of 7:3. The random copolymer had a relative viscosity of 1.26. As analyzed by DSC, the random copolymer had Tg of 117° C. without Tcc and Tm, it means that the random copolymer was an amorphous copolymer.

Comparative Example 1

Commercially available polyamide (Bright (BR) grade nylon pellets, Li Peng Changhua Polyamide Factory) was provided, which had a repeating unit

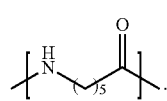

The polyamide plastic pellets were put into a film extruder under nitrogen, melting blended at 220° C. to 260° C., and then extruded from a T-die to form a flat sheet-like film. The sheet-like film was then attached to a cooling roller at 30° C. to 35° C., and then wound by a drawing roller to form a sheet. The sheet was then pre-heated to 190° C. by a biaxial stretcher (KARO IV), and then simultaneously biaxially stretched along MD and TD at a stretching rate of 100 mm/second, in which both the stretching ratios of MD and TD were 3.0 times. The stretched film was then put into a heat treatment oven at 210° C. for heat setting the film. The polyamide in the film had a crystallinity of 27.3% and a relative viscosity of 3.0 to 3.3. The film had a thickness of 15 micrometers. The easy-tear test was performed on the film, and the vertical distance between the ideal tear line and the tear location was 12 mm. In short, the film did not have the easy-tear properties.

Comparative Example 2

75 parts by weight of the commercially available polyamide (BR grade nylon pellets, Li Peng Changhua Polyamide Factory) and 25 parts by weight of the random copolymer in Preparation Example 1 were put into the film extruder under nitrogen, melting blended at 220° C. to 260° C., and then extruded from a T-die to form a film. Because crystalline random copolymer in Preparation Example 1 had the melting point that was too high, the blend of the crystalline random copolymer in Preparation Example 1 and the commercially available polyamide broke easily during manufacturing and was difficult to process.

Example 1

85 parts by weight of the commercially available polyamide (BR grade nylon pellets, Li Peng Changhua Polyamide Factory) and 15 parts by weight of the random copolymer in Preparation Example 2 were put into the film extruder under nitrogen, melting blended at 220° C. to 260° C., and then extruded from a T-die to form a flat sheet-like film. The sheet-like film was then attached to a cooling roller at 30° C. to 35° C., and then wound by a drawing roller to form a sheet. The sheet was then pre-heated to 190° C. by the biaxial stretcher (KARO IV), and then simultaneously biaxially stretched along MD and TD at a stretching rate of 100 mm/second, in which both the stretching ratios of MD and TD were 3.0 times. The stretched film was then put into a heat treatment oven at 210° C. for heat setting the film. The blend in the film had a crystallinity of 25.4%. The film had a thickness of 15 micrometers. The easy-tear test was performed on the film, and the vertical distance between the ideal tear line and the tear location was 10 mm. In short, the film did not have easy-tear properties.

The above steps were repeated, and the difference in this repeat was the biaxial stretching rate being reduced from 100 mm/second to 50 mm/second. The easy-tear test was performed on the film, and the vertical distance between the ideal tear line and the tear location was 6 mm. In short, the film still did not have easy-tear properties.

The above steps were repeated, and the difference in this repeat was the biaxial stretching rate being reduced from 100 mm/second to 25 mm/second. The easy-tear test was performed on the film, and the vertical distance between the ideal tear line and the tear location was 3 mm. In short, the film had easy-tear properties. Accordingly, the biaxial stretching rate could be fine-tuned to make the film blended with the crystalline random copolymer have easy-tear properties.

Example 2

75 parts by weight of the commercially available polyamide (BR grade nylon pellets, Li Peng Changhua Polyamide Factory) and 25 parts by weight of the random copolymer in Preparation Example 2 were put into the film extruder under nitrogen, melting blended at 220° C. to 260° C., and then extruded from a T-die to form a flat sheet-like film. The sheet-like film was then attached to a cooling roller at 30° C. to 35° C., and then wound by a drawing roller to form a sheet. The sheet was then pre-heated to 190° C. by the biaxial stretcher (KARO IV), and then simultaneously biaxially stretched along MD and TD at a stretching rate of 100 mm/second, in which both the stretching ratios of MD and TD were 3.0 times. The stretched film was then put into a heat treatment oven at 210° C. for heat setting the film. The blend in the film had a crystallinity of 23.3%. The film had a thickness of 15 micrometers. The easy-tear test was performed on the film, and the vertical distance between the ideal tear line and the tear location was 4 mm. In short, the film had easy-tear properties.

The film of the blend was laminated to a linear low density polyethylene film (LLDPE, thickness of 70 micrometers, *Formosa* Flexible Packaging Co.) to form a laminated film. The easy-tear test was performed for the laminated film, and the vertical distance between the ideal tear line and the tear location was 2 mm. In short, the laminated film still had easy-tear properties.

Alternatively, the film in Comparative Example 1 was laminated to the linear low density polyethylene film to form a laminated film. The easy-tear test was performed for the laminated film, and the vertical distance between the ideal tear line and the tear location was 19 mm. In short, the laminated film did not have easy-tear properties.

Comparative Example 3

75 parts by weight of the commercially available polyamide (BR grade nylon pellets, Li Peng Changhua Polyamide Factory) and 25 parts by weight of the random copolymer in Preparation Example 3 were put into the film extruder under nitrogen, melting blended at 220° C. to 260° C., and then extruded from a T-die to form a flat sheet-like film. The sheet-like film was then attached to a cooling roller at 30° C. to 35° C., and then wound by a drawing roller to form a sheet. The sheet was then pre-heated to 190° C. by the biaxial stretcher (KARO IV), and then simultaneously biaxially stretched along MD and TD at a stretching rate of 100 mm/second, in which both the stretching ratios of MD and TD were 3.0 times. The stretched film was then put into a heat treatment oven at 210° C. for heat setting the film. The blend in the film had a crystallinity of 20.7%. The film had a thickness of 15 micrometers. The easy-tear test was performed on the film, and the vertical distance between the ideal tear line and the tear location was 8 mm. In short, the film did not have easy-tear properties. Accordingly, the amorphous copolymer could not make the film of the blend have easy-tear properties.

The above steps were repeated, and the difference in this repeat was the biaxial stretching rate being reduced from 100 mm/second to 25 mm/second. The easy-tear test was performed on the film, and the vertical distance between the ideal tear line and the tear location was also larger than 5 mm. In short, the film still did not have easy-tear properties. Accordingly, the film blended with the amorphous random copolymer still did not have easy-tear properties even if the biaxial stretching rate was fine-tuned.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A polyamide composition for an easy-tear polyamide film, comprising:
   a blend of a first polyamide and a second polyamide, wherein the first polyamide has a repeating unit of

(a)

and the second polyamide has repeating units of

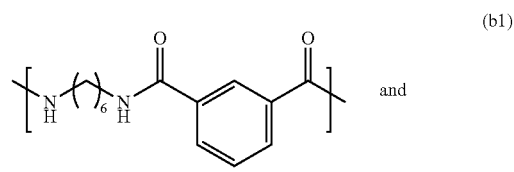 and (b1)

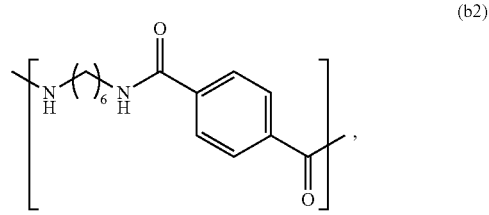

(b2)

and the second polyamide is a crystalline random copolymer,
wherein the first polyamide and the second polyamide have a weight ratio of 90:10 to 70:30,
wherein the repeating units

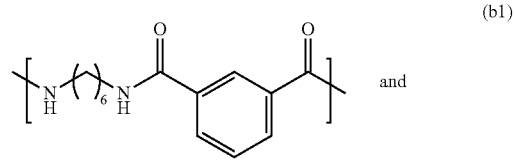 and (b1)

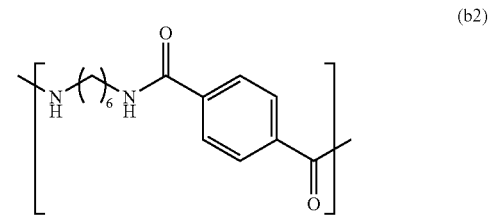

(b2)

of the second polyamide have a molar ratio of 65:35 to 55:45, and wherein the polyamide film is considered easy-tear when a vertical distance between an ideal tear line and a tear location is equal to or less than 5 mm, wherein the tear location is laterally spaced 10 cm from an opening of the polyamide film and the ideal tear line is laterally extended from the opening and vertical to an edge of the polyamide film.

2. The polyamide composition as claimed in claim 1, wherein the first polyamide and the second polyamide have a weight ratio of 85:15 to 75:25.

3. The polyamide composition as claimed in claim 1, wherein the first polyamide has a relative viscosity of 2.5 to 4.0 at 25° C.

4. The polyamide composition as claimed in claim 1, wherein the second polyamide has a relative viscosity of 1.01 to 2.5 at 25° C.

5. A film, comprising a polyamide composition including a blend of a first polyamide and a second polyamide,
wherein the first polyamide has a repeating unit of

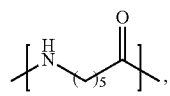
(a)

and the second polyamide has repeating units of

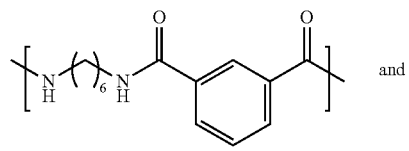
(b1)

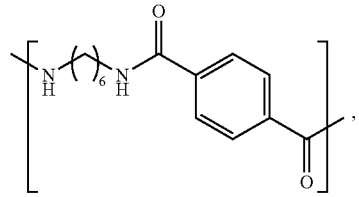
(b2)

and the second polyamide is a crystalline random copolymer, wherein the first polyamide and the second polyamide have a weight ratio of 90:10 to 70:30, wherein the repeating units

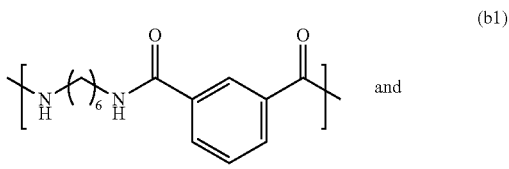
(b1)

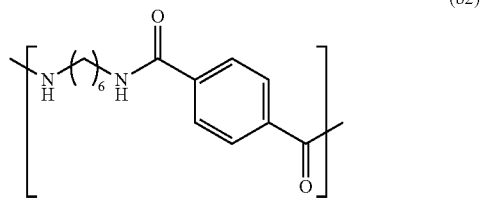
(b2)

of the second polyamide have a molar ratio of 65:35 to 55:45, wherein the film is an easy-tear polyamide film, and wherein the polyamide film is considered easy-tear when a vertical distance between an ideal tear line and a tear location is equal to or less than 5 mm, wherein the tear location is laterally spaced 10 cm from an opening of the polyamide film and the ideal tear line is laterally extended from the opening and vertical to an edge of the polyamide film.

6. The film as claimed in claim 5, being laminated to a polymer film, a metal foil, or a combination thereof to form a laminated film.

7. A method of forming the film as claimed in claim 5, comprising:
providing a sheet from the polyamide composition; and
biaxial stretching of the sheet to form the film,
wherein the sheet of the polyamide composition is biaxially stretched at a rate of 20 mm/sec to 100 mm/sec.

8. The method as claimed in claim 7, wherein the sheet from the polyamide composition is biaxially stretched at a rate of 20 mm/sec to 40 mm/sec.

* * * * *